United States Patent Office 3,134,822
Patented May 26, 1964

3,134,822
BENZENE ALKYLATION WITH A CATALYST CONSISTING ESSENTIALLY OF EITHER SbCl₅ OR SnCl₄ AND AN ALKYL ALUMINUM SESQUICHLORIDE
Russell G. Hay, Gibsonia, Leo F. Meyer, Pittsburgh, and Charles M. Selwitz, Pitcairn, Pa., assignors to Gulf Research & Development Company, Pittsburgh, Pa., a corporation of Delaware
No Drawing. Filed Dec. 1, 1959, Ser. No. 856,350
6 Claims. (Cl. 260—671)

This invention relates to a process for preparing an alkyl aromatic.

Alkyl aromatics are prepared in accordance with the process of this invention by reacting an alkylatable aromatic hydrocarbon with an olefin in the presence of a catalyst mixture containing an organo aluminum halide and a heavy metal halide wherein the metallic portion thereof is selected from the group consisting of molybdenum, antimony and tin. By operating in accordance with such process alkyl groups are obtained on the aromatic hydrocarbon having the same number of carbon atoms as the alkylating olefin.

Any alkylatable aromatic hydrocarbon can be employed in the reaction, whether it be solid or liquid, mononuclear, dinuclear or polynuclear, substituted or unsubstituted. Among the mononuclear alkylatable aromatic compounds which are preferred are benzene and substituted benzenes containing as substituents from one to three alkyl radicals having from one to 20 carbon atoms, preferably from one to 10 carbon atoms. Among the dinuclear alkylatable aromatic compounds which are preferred are naphthalene and substituted naphthalenes containing as substituents from one to 4 alkyl radicals having from one to 20 carbon atoms, preferably from one to 10 carbon atoms. Examples of alkylatable aromatic compounds which can be employed are benzene, toluene, ethylbenzene, xylenes, tetralin, cumene, diisopropylbenzenes, n-octylbenzene, 2-phenyl-4-ethyloctadecane, naphthalene, isopropylnaphthalenes, diisopropylnaphthalenes, 1-ethyl-6-isobutylnaphthalene, 1,2,4-triisopropylbenzene, phenanthrene, etc. In the event the alkylatable aromatic compound is normally liquid, no extraneous solvent need be employed in the reaction. With a normally solid alkylatable hydrocarbon an inert solvent such as heptane, normal octane, isooctane, etc., can be employed.

While olefins having from two carbon atoms and up to 30 carbon atoms can be employed in the alkylation reaction, olefins having from three to 20 carbon atoms are preferred. Examples of olefins which can be employed are ethylene, propylene, isobutylene, butene-1, cis-butene-2, trans-butene-2, pentene-1, cyclopentene, cyclohexene, cycloheptene, 4-methylcyclooctene, 2-methylbutene-1, 2-methylbutene-2, 3-methylbutene-1, cis-pentene-2, trans-pentene-2, hexene-1, cis-hexene-2, trans-hexene-2, 5,6-dimethylheptene-1, tetrapropylene, pentadecene-1, 6-cyclohexyldodecene-1, 4-n-nonyldodecene-1, n-tetracosene-1, n-heptacosene-1, 13-cyclopentylpentacosene, etc.

The amount of olefin which need be present at any moment during the reaction can of course be small. While the total amount of olefin which will be required for the reaction can be added to the reaction zone initially with the alkylatable aromatic compound this is not preferred because of the tendency of some of the olefin to polymerize. Desirably a small amount of olefin is added to the reaction zone as the reaction progresses and until reaction ceases. The total amount of olefin consumed will of course vary with the alkylatable aromatic compound and olefin employed, the pressure, temperature, reaction time, catalysts, etc. In general the total amount of olefin can be at least about 0.2 mol., but preferably about one to about four mols., per mol. of alkylatable aromatic compound.

The organo aluminum halide which forms one of the active agents in the catalyst system employed can be defined by the formula $R_aALX_b$, wherein R can be an aromatic radical such as phenyl, tolyl, xylyl, etc.; or an alkyl group having from one to 10 carbon atoms, preferably from one to four carbon atoms, such as methyl, ethyl, propyl, isopropyl, isobutyl, normal butyl, etc.; X is a halogen atom selected from the group consisting of fluorine, chlorine, bromine and iodine; and $a$ and $b$ are values from one to two. Examples of organo aluminum halides which can be employed are ethylaluminum sesquichloride, methylaluminum sesquichloride, ethylaluminum sesquibromide, isobutylaluminum sesquichloride, diethylaluminum chloride, ethylaluminum sesquifluoride, n-butylaluminum dibromide, decylaluminum sesquichloride, methylaluminum sesquiiodide, etc.

The heavy metal halide which is employed in conjunction with the organo aluminum halide as the second active agent in the catalyst system is critical in order to obtain the desired alkylation reaction of this invention. The metallic portion of said heavy metal halide is critical and must be selected from the group consisting of molybdenum, antimony and tin. Many metal salts, including heavy metal salts, wherein the metallic portion thereof is not selected from the defined group are inoperative for purposes of this invention. Thus, such metal salts as ferric chloride ($FeCl_3$), thorium chloride ($ThCl_4$), silicon chloride ($SiCl_4$), chromium chloride ($CrCl_3$) and chromium oxygen chloride ($CrO_2Cl_2$) have not been found to be satisfactory.

Excellent results are obtained by carrying out the alkylation reaction of this invention using the heavy metal halide and an organo aluminum halide in a molar ratio of about one to one to about nine to one, preferably about three to one to about four to one. The total amount of catalyst employed is not critical, although the amount thereof has a pronounced affect on the extent of alkylation and the position assumed by the alkyl groups on the alkylatable aromatic compound. Thus the total amount of catalyst required must be at least about 0.1 millimol of catalyst per mol. of alkylatable aromatic compound, preferably about one to about 10 millimols of catalyst per mol. of alkylatable aromatic compound.

The reaction pressure is not critical and can be varied over a wide range. Since the catalyst is in the liquid phase, the alkylatable aromatic desirably is also in the liquid phase. In order, therefore, to contact the alkylatable aromatic at the high temperatures which have been found necessary for the alkylation reaction of this invention, elevated pressures are thus required. With higher boiling alkylatable aromatics, of course, lower pressures can be employed. Thus the pressure can be from about atmospheric to about 500 pounds per square inch gauge or higher.

The temperature of the reaction is not critical and can be varied over a wide range. This is surprising in view of our discovery in our copending application Serial No. 856,349, filed concurrently herewith, that the temperature in the type of reaction under consideration is critical when a halide of titanium, zirconium or hafnium is employed in the catalyst system. Thus the temperature can be as low as 10° C. or as high as 220° C. and satisfactory results will be obtained, but we prefer to employ a temperature within the range of 40° to about 140° C.

Reaction time can be of short duration and can be controlled in any suitable manner. Since the reaction is exothermic, the temperature and contact time thereof can also be controlled by the rate of addition of olefin to the alkylatable aromatic compound. An additional advantage resulting from the addition of olefin to the alkylatable aromatic compound is that olefin polymerization is thereby inhibited. Thus a reaction time of at least about 5 minutes, preferably about one to about 4 hours is suitable.

After the desired reaction has been completed, the catalyst is deactivated and further reaction terminated in any convenient manner, for example, by hydrolyzing the same with a compound containing an active hydrogen such as water or methanol. The products can be recovered by the simple expedient of distillation.

The process can be further illustrated by reference to the following examples. In each of the examples whose data are tabulated in the table below the alkylatable compound was benzene and the olefin propylene. In general 352 grams of benzene were placed in a flask having an inert atmosphere. The designated amount of catalyst was then added and the system pressured to about 150 pounds per square inch gauge with propylene. The reaction was permitted to proceed until the pressure was reduced to about 80 pounds per square inch gauge, at which point the system was again pressured with propylene to 150 pounds per square inch pressure. This procedure was repeated for the designated time. At the end of the reaction period the catalyst was deactivated by hydrolyzing the same with methanol and the individual components recovered by distillation.

*Table*

| Example | Catalysts, Millimols Per Mol of Benzene | Reaction Time, Hrs. | Temp., °C. | Gms. Prod. Including Unreacted Benzene | Percent by Weight in Product of— | | | | | | |
|---|---|---|---|---|---|---|---|---|---|---|---|
| | | | | | 1,2,4,5-tetra-isopropyl-benzene | 1,3,5-tri-isopropyl-benzene | 1,2,4-tri-isopropyl-benzene | Cumene | Di-iso-propyl-benzene | Benzene | Polymer |
| 1 | 0.553 EASC  1.66 SbCl₅ | 4 | 140 | 850 | 30 | 32 | 0 | 4 | 15 | 3 | 5 |
| 2 | 0.553 EASC  1.66 SnCl₄ | 1 | 140 | 900 | 12 | 54 | 12 | 3 | 4 | 2 | 10 |
| 3 | 1.11 EASC  3.32 SnCl₄ | 1.5 | 120 | 1,015 | 31 | 58 | 3 | 0 | 0 | 2 | 8 |
| 4 | 0.735 MASC  1.48 MoCl₅ | 4 | 45 | 703 | 15 | 15 | 12 | 18 | 19 | 21 | 0 |
| 5 | 0.735 MASC  1.48 SbCl₅ | 4 | 45 | 613 | 4 | 10 | 11 | 21 | 22 | 32 | 0 |
| 6 | 0.735 MASC  1.48 SnCl₄ | 4 | 50 | 760 | 22 | 13 | 17 | 14 | 19 | 15 | 0 |
| 7 | 0.830 MASC  2.49 MoCl₅ | 4 | 160 | 540 | 0 | 14 | 10 | 27 | 23 | 26 | 0 |
| 8 | 0.735 MASC  1.48 CoCl₂ | 1 | 40 | 352 | 0 | 0 | 0 | 0 | 0 | 100 | 0 |
| 9 | 0.735 MASC  1.48 CrCl₃ | 1 | 40 | 352 | 0 | 0 | 0 | 0 | 0 | 100 | 0 |
| 10 | 0.553 EASC  1.66 CoCl₂ | 1 | 105 | 352 | 0 | 0 | 0 | 0 | 0 | 100 | 0 |
| 11 | 0.553 EASC  1.66 CoCl₂ | 1 | 110 | 352 | 0 | 0 | 0 | 0 | 0 | 100 | 0 |
| 12 | 0.553 EASC  1.66 CoCl₂ | 4 | 130 | 352 | 0 | 0 | 0 | 0 | 0 | 100 | 0 |
| 13 | 0.553 EASC  1.66 CoCl₂ | 1 | 110 | 352 | 0 | 0 | 0 | 0 | 0 | 100 | 0 |
| 14 | 0.222 EASC  0.666 CrCl₃ | 4 | 110 | 352 | 0 | 0 | 0 | 0 | 0 | 100 | 0 |
| 15 | 0.553 EASC  1.66 FeCl₃ | 4 | 120 | 352 | 0 | 0 | 0 | 0 | 0 | 100 | 0 |
| 16 | 0.553 EASC  1.66 ThCl₄ | 1 | 100 | 352 | 0 | 0 | 0 | 0 | 0 | 100 | 0 |
| 17 | 0.553 EASC  1.66 CrO₂Cl₂ | ½ | 80 | 352 | 0 | 0 | 0 | 0 | 0 | 100 | 0 |
| 18 | 0.553 EASC  1.66 SiCl₄ | ½ | 110 | 352 | 0 | 0 | 0 | 0 | 0 | 100 | 0 |
| 19 | 0.553 EASC  1.66 Mo(CO)₆ | 3 | 120 | 352 | 0 | 0 | 0 | 0 | 0 | 100 | 0 |

In the above table MASC refers to methyl aluminum sesquichloride and EASC to ethyl aluminum sesquichloride. It can be seen from the data in Table I that excellent results are obtained in accordance with the process of this invention when the heavy metal halide in the catalyst system was one wherein the metal portion thereof was molybdenum, antimony or tin and that this was true over a wide temperature range. On the other hand, the table shows that when such heavy metal halides were replaced with compounds of iron, thorium, silicon, chromium or cobalt or a molybdenum compound which was not a halide, no alkylation took place. Note, too, that the alkyl aromatic obtained in each case contained alkyl substituents having the same number of carbon atoms as the alkylating olefin.

Obviously, many modifications and variations of the invention, as hereinabove set forth, can be made without departing from the spirit and scope thereof, and therefore only such limitations should be imposed as are indicated in the appended claims.

We claim:

1. A process for alkylating benzene which comprises reacting benzene with propylene in the presence of a catalyst system consisting essentially of SbCl₅ and an alkyl aluminum sesquichloride wherein the alkyl substituent has from one to four carbon atoms, the molar ratio of said SbCl₅ to said alkyl aluminum sesquichloride being from about 1:1 to about 9:1, the total amount of catalyst being at least about 0.1 millimol per mol of said benzene, at a temperature of about 10° to about 220° C. for at least about five minutes.

2. A process for alkylating benzene which comprises reacting benzene with propylene in the presence of a catalyst system consisting essentially of SnCl₄ and an alkyl aluminum sesquichloride wherein the alkyl substituent has from one to four carbon atoms, the molar ratio of said SnCl₄ to said alkyl aluminum sesquichloride being from about 1:1 to about 9:1, the total amount of catalyst being at least about 0.1 millimol per mol of said benzene, at a temperature of about 10° to about 220° C. for at least about five minutes.

3. A process for alkylating benzene which comprises reacting benzene with propylene in the presence of a catalyst consisting essentially of SbCl₅ and methyl aluminum sesquichloride, the molar ratio of said SbCl₅ to said methyl aluminum sesquichloride being from about 1:1 to about 9:1, the total amount of catalyst being at least about 0.1 millimol per mol of said benzene, at a temperature of about 10° to about 220° C. for at least about five minutes.

4. A process for alkylating benzene which comprises reacting benzene with propylene in the presence of a catalyst system consisting essentially of SnCl₄ and methyl aluminum sesquichloride, the molar ratio of said SnCl₄ to said methyl aluminum sesquichloride being from about 1:1 to about 9:1, the total amount of catalyst being at least about 0.1 millimol per mol of said benzene, at a temperature of about 10° to about 220° C. for at least about five minutes.

5. A process for alkylating benzene which comprises reacting benzene with propylene in the presence of a catalyst consisting essentially of SbCl₅ and ethyl aluminum sesquichloride, the molar ratio of said SbCl₅ to said ethyl aluminum sesquichloride being from about 1:1 to about 9:1, the total amount of catalyst being at least about 0.1 millimol per mol of said benzene, at a temperature of about 10° to about 220° C. for at least about five minutes.

6. A process for alkylating benzene which comprises reacting benzene with propylene in the presence of a catalyst system consisting essentially of SnCl₄ and ethyl aluminum sesquichloride, the molar ratio of said SnCl₄ to said ethyl aluminum sequichloride being from about 1:1 to about 9:1, the total amount of catalyst being at least about 0.1 millimol per mol of said benzene, at a temperature of about 10° to about 220° C. for at least about five minutes.

References Cited in the file of this patent

UNITED STATES PATENTS

| | | |
|---|---|---|
| 2,388,428 | Mavity | Nov. 6, 1945 |
| 2,304,290 | van Peski | Dec. 8, 1952 |
| 2,824,145 | | |
| 2,849,505 | | |
| 2,927,086 | | |
| 2,935,542 | | |
| 3,031,514 | | |
| | McCall et al. | Feb. 18, 1958 |
| | Schmerling | Aug. 26, 1958 |
| | Gordon et al. | Mar. 1, 1960 |
| | Minckler et al. | May 3, 1960 |
| | Kosmin | Apr. 24, 1962 |

FOREIGN PATENTS

| 785,314 | Great Britain | Oct. 23, 1957 |
|---|---|---|